United States Patent
Kravtsov et al.

(10) Patent No.: US 12,554,851 B2
(45) Date of Patent: Feb. 17, 2026

(54) SYSTEMS AND METHODS FOR API SECURITY INTEGRATION

(71) Applicant: Cisco Technology, Inc., San Jose, CA (US)

(72) Inventors: Alexei Kravtsov, Petah Tikva (IL); Giovanni Conte, Paris (FR); Hendrikus G. P. Bosch, Aalsmeer (NL)

(73) Assignee: Cisco Technology, Inc., San Jose, CA (US)

( * ) Notice: Subject to any disclaimer, the term of this patent is extended or adjusted under 35 U.S.C. 154(b) by 463 days.

(21) Appl. No.: 18/317,471

(22) Filed: May 15, 2023

(65) Prior Publication Data
US 2024/0134979 A1    Apr. 25, 2024
US 2024/0232354 A9    Jul. 11, 2024

Related U.S. Application Data

(60) Provisional application No. 63/380,862, filed on Oct. 25, 2022.

(51) Int. Cl.
*G06F 21/56* (2013.01)
*G06F 21/57* (2013.01)

(52) U.S. Cl.
CPC .......... *G06F 21/566* (2013.01); *G06F 21/577* (2013.01); *G06F 2221/033* (2013.01)

(58) Field of Classification Search
CPC . G06F 21/52; G06F 21/57; G06F 8/60; G06F 8/71
See application file for complete search history.

(56) References Cited

U.S. PATENT DOCUMENTS

| | | |
|---|---|---|
| 10,929,211 B1 | 2/2021 | Mylavarapu et al. |
| 11,275,569 B1 | 3/2022 | Zhang et al. |
| 11,463,544 B1 | 10/2022 | Peddada et al. |
| 2019/0213326 A1* | 7/2019 | Dykes ............... G06F 21/552 |
| 2019/0303187 A1 | 10/2019 | Vu et al. |
| 2021/0049053 A1 | 2/2021 | Macleod et al. |
| 2021/0064354 A1 | 3/2021 | Atkinson et al. |
| 2021/0385252 A1 | 12/2021 | Lebin et al. |
| 2022/0057999 A1* | 2/2022 | Pitchai Muthu ........ G06F 21/51 |
| 2022/0222335 A1 | 7/2022 | Bosch et al. |
| 2022/0283801 A1 | 9/2022 | Hoenzsch et al. |
| 2023/0093304 A1* | 3/2023 | Brasburg ............ G06F 21/6218 717/120 |

(Continued)

OTHER PUBLICATIONS

European Search Report in European Patent Application No. 23205626.7, dated Mar. 11, 2024, 10 Pages.

(Continued)

*Primary Examiner* — Thaddeus J Plecha
(74) *Attorney, Agent, or Firm* — Baker Botts L.L.P.

(57) ABSTRACT

In one embodiment, a method includes generating an application programming interface (API) definition by observing traffic. The API definition is associated with an API definition name and an API specification. The method also includes mounting the API definition with an application and deploying the application by a Continuous Integration/Continuous Delivery (CI/CD) pipeline. The method further includes implementing a runtime API and mapping the runtime API to the API definition.

20 Claims, 3 Drawing Sheets

(56) References Cited

U.S. PATENT DOCUMENTS

2023/0214506 A1\* 7/2023 Narayan ............... G06F 21/604
                                                        726/1

OTHER PUBLICATIONS

Yasmin J., et al., "A First Look at the Deprecation of RESTful APIs: An Empirical Study", 2020 IEEE International Conference on Software Maintenance and Evolution (ICSME), IEEE, Sep. 28, 2020, XP033848709, pp. 151-161, p. 3.

\* cited by examiner

SYSTEMS AND METHODS FOR API SECURITY INTEGRATION

CROSS-REFERENCE TO RELATED APPLICATIONS

This application claims benefit of U.S. Provisional Patent Application No. 63/380,862 filed Oct. 25, 2022, by Alexei Kravtsov et al, and entitled "SYSTEMS AND METHODS FOR DEVICE API SECURITY INTEGRATION IN CI/CD PHASES," which is incorporated herein by reference as if reproduced in its entirety.

TECHNICAL FIELD

The present disclosure relates generally to application security, and more specifically to systems and methods for application programming interface (API) security integration.

BACKGROUND

APIs are software interfaces that assist two or more computers in communicating with each other. API specifications describe how to build and/or use these software interfaces. Developers often change API specifications to include, for example, new functions. API specifications may be added by a Continuous Integration/Continuous Delivery (CI/CD) pipeline. However, identifying a particular API specification during API runtime may prove challenging.

DESCRIPTION OF EXAMPLE EMBODIMENTS

Overview

Figure 1:
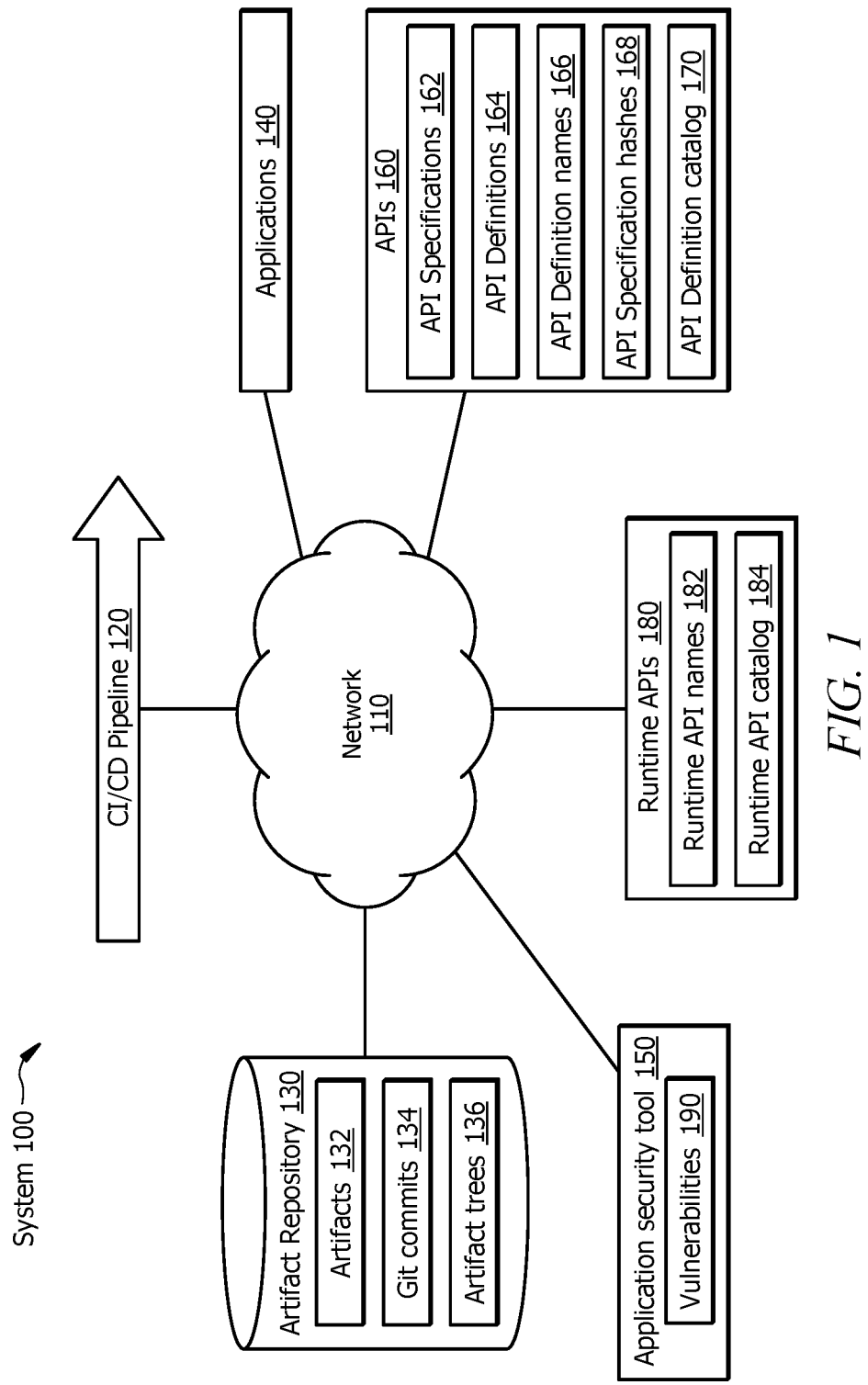
FIG. 1 illustrates a system for API security integration, in accordance with certain embodiments.

According to an embodiment, an application security tool includes one or more processors and one or more computer-readable non-transitory storage media coupled to the one or more processors and including instructions that, when executed by the one or more processors, cause the application security tool to perform operations. The operations include generating an application programming interface (API) definition by observing traffic. The API definition may be associated with an API definition name and an API specification. The operations also include mounting the API definition with an application and deploying the application by a Continuous Integration/Continuous Delivery (CI/CD) pipeline. The operations further include implementing a runtime API and mapping the runtime API to the API definition.

In certain embodiments, generating the API definition includes generating a hash of the API specification and/or concatenating the API definition name and the hash of the API specification. In some embodiments, the operations include associating the hash of the API specification with a unique hash of a Git commit and/or mapping the runtime API to the API definition using the unique hash of the Git commit.

In certain embodiments, the operations include associating the runtime API with a runtime API name and/or mapping the runtime API to the API definition using the runtime API name and the API definition name. In some embodiments, the operations include performing a runtime analysis of the runtime API, determining, in response to performing the runtime analysis, whether the API definition is a shadow API, and/or determining, in response to performing the runtime analysis, whether the API definition is a zombie API.

In certain embodiments, the operations include generating a catalog of a plurality of API definitions, generating a plurality of runtime APIs, mapping the plurality of runtime APIs to the API definition, and/or creating a tab for the API definition in the catalog of API definitions, wherein the tab visually represents the plurality of runtime APIs. In some embodiments, the operations include generating an API definition catalog for a plurality of API definitions, generating a runtime API catalog for a plurality of runtime APIs, mapping the plurality of runtime APIs to the plurality of API definitions, and/or generating a visual representation of the API definition catalog and the runtime API catalog that links the plurality of API definitions to the plurality of runtime APIs.

According to another embodiment, a method includes generating an API definition by observing traffic. The API definition may be associated with an API definition name and an API specification. The method also includes mounting the API definition with an application and deploying the application by a CI/CD pipeline. The method further includes implementing a runtime API and mapping the runtime API to the API definition.

According to yet another embodiment, one or more computer-readable non-transitory storage media embody instructions that, when executed by a processor, cause the processor to perform operations. The operations include generating an API definition by observing traffic. The API definition may be associated with an API definition name and an API specification. The operations also include mounting the API definition with an application and deploying the application by a CI/CD pipeline. The operations further include implementing a runtime API and mapping the runtime API to the API definition.

Technical advantages of certain embodiments of this disclosure may include one or more of the following. The systems and methods described herein associate APIs with the runtime environment, which assists users (e.g., developers) in understanding the origin, the context of source control, and/or the context of CD in runtime. For example, the developer will know which API version they are trying and how to trace it back to the committed Git. The API specification and/or the Git commits may be used to make the correlation. Certain embodiments described herein tie discovered vulnerabilities to artifact trees. As vulnerabilities are discovered, either in infrastructural components or in the software for the server application, the artifact trees are attributed with those discovered issues. The artifact trees with the discovered vulnerabilities can be used for pentesters and fuzzers. For example, specific tests may be developed that try to exploit those vulnerabilities.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for device API security integration. FIG. 1 illustrates an example system for API security integration, in accordance with certain embodiments. System 100 or portions thereof may be associated with an entity, which may include any entity, such as a business, company, or enterprise, that performs API security integration. The components of system 100 may include any combination of hardware, firmware, and software. For example, the components of system 100 may use one or more elements of the computer system of FIG. 3. In the illustrated embodiment of FIG. 1, system 100 includes a network 110, a CI/CD pipeline 120, an artifact repository 130, artifacts 132, Git commits 134, artifact trees 136, applications 140, an application security tool 150, APIs 160, API specifications 162, API definitions 164, API definition names 166, API specification hashes 168, an API definition catalog 170, runtime APIs 180, runtime API names 182, a runtime API catalog 184, and vulnerabilities 190.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined WAN (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more physical devices, virtual machines, bare metal servers, and the like. As another example, nodes may include data communications equipment such as computers, routers, servers, printers, devices, workstations, switches, bridges, modems, hubs, and the like.

CI/CD pipeline 120 of system is a series of steps that automate the software delivery process. CI/CD steps may include a continuous integration (CI) phase (e.g., writing code, building code, testing, fixing vulnerabilities, performing updates, etc.) and a continuous delivery (CD) phase (e.g., releasing, deploying, operating, monitoring, etc.).

Artifact repository 130 of system 100 is a centrally located storage that tracks and/or stores the history of changes made to files. In certain embodiments, artifact repository 130 stores artifacts 132. Artifacts 132 of system 100 are tangible by-products produced during the development of software. In certain embodiments, artifacts 132 are associated with the function, architecture, and/or design of software. For example, artifacts 132 may include Unified Modeling Language (UML) models, requirements, design documents, use cases, class diagrams, and the like.

In some embodiments, artifacts 132 are associated with the process of development itself. For example, artifacts 132 may include project plans, business cases, risk assessments, and the like. In certain embodiments, artifacts 132 are associated with automated behavior and/or control sequences. For example, artifacts 132 may include database requests, grammar rules, user-generated content, and the like. Artifacts 132 may vary in their maintainability. For example, artifacts 132 may be practical or symbolic.

Git commits 134 of system 100 are used to record changes in artifact repository 130. Git commits 134 represent snapshots of artifact repository 130 at specific points in time. Git commits 134 may be included in one or more artifact trees 136. Artifact trees 136 of system 100 are internal data structures that record directory trees and/or sub-trees. In certain embodiments, artifact trees 136 are objects that create the hierarchy between artifacts 132 in artifact repository 130. Artifact trees 136 may be used to create relationships between directories and the files they contain.

Applications 140 of system 100 are computer programs designed to implement specific tasks. Applications 140 may include web applications and/or native applications. Applications 140 may include word processing software, graphics software, spreadsheet software, accounting software, data management software, documentation software, enterprise resource planning, financial software, field service management software, project management software, entertainment software, educational software, enterprise infrastructure software, presentation software, web browsers, or any other suitable types of applications. In certain embodiments, applications 140 are deployed by CI/CD pipeline 120.

Application security tool 150 of system 100 represents any software and/or hardware that assists users (e.g., developers) in increasing the security of applications 140. In certain embodiments, application security tool 150 allows developers and/or engineers to implement cloud-native security measures throughout the entire software development lifecycle, from initial application development to ongoing runtime management. In some embodiments, application security tool 150 includes a streamlined interface that provides security for container, serverless, API, service mesh, Kubernetes environments, and the like.

APIs 160 of system 100 are software intermediaries that allow applications 140 to communicate with one other using a set of definitions and/or protocols. For example, APIs 160 may process data received from one application 140 and transmit the results back to another application 140. APIs 160 may be used for programming languages, software libraries, computer operating systems, computer hardware, and the like. APIs 160 may include internal APIs that provide access to sensitive resources within the software system of an entity. APIs 160 may be developed using Flask, FastAPI, Spring Boot, Ruby on Rails, Django RES, Express Js, Fastify, Play Framework, Gin, or any other suitable web framework. APIs 160 may use the representational state transfer (REST) architecture, the remote procedural call (RPC) protocol, the simple object access protocol (SOAP), or any other suitable API protocol or architecture. In the illustrated embodiment of FIG. 1, each API 160 includes a corresponding API specification 162.

API specifications 162 of system 100 describe the functional and/or expected behavior of APIs 160. In certain embodiments, API specifications 162 may define the tools and/or services of APIs 160 via subroutines, methods, requests, endpoints, and the like. An example of API specification 162 is an OpenAPI Specification (OAS). The OAS is a specification for a machine-readable interface definition language for describing, producing, consuming, and/or visualizing web services.

In certain embodiments, a user (e.g., a developer) may create new API specifications 162. For example, a developer may include new functions in API specifications 162 to generate new API specifications 162. New API specifications 162 require different hashes to link each new API specification 162 to one or more corresponding running containers. APIs 160 may be treated similar to how images are currently treated. For example, during CI/CD phases of CI/CD pipeline 120, a list of images may be added either manually or via CI. These images have a name, a hash, and a list of vulnerabilities as discovered via scanning. These images are not necessarily running in a cluster. In some embodiments, multiple images with the same name and different hashes are maintained in this list. During runtime, each workload is attached to one image of the CI/CD images.

To replicate the same concept for internal APIs 160, API definition catalog 170 of API definitions 164 may be generated. API definition catalog 170 is a searchable library of API definitions 164. API definitions 164 represent API specifications 162 and/or description formats that are also associated with API definition names 166. For example, each API definition 164 may be associated with a particular API specification 162 and a particular API definition name 166. API definition names 166 represent unique identifiers that are used to identify API definitions 164. API definition names 166 may include alphabetical characters, numbers, symbols, a combination thereof, or any other suitable identification. In certain embodiments, API definition names 166 may indicate the type of API (e.g., an API for accounts, an API for payments, an API for contacts, etc.). For example, API definition names 166 may include "accounts", "payment", "amount", "account name", "leads", "contacts", "potentials", "sheets", and the like.

API specification hashes 168 of system 100 are cryptographic hashes of API specifications 162. API specification hashes 168 may be generated using any suitable algorithms. For example, API specification hashes 168 may be generated using a Secure Hash Algorithm (SHA)-1, SHA-2, SHA-256, SHA-512, SHA-224, and SHA-384, Message Digest 5 (MD5), a Lan Manager (LM) authentication protocol (LANMAN), New Technology LAN Manager (NTLM), and the like. In some embodiments, API definition 164 is referred to by it associated API definition name 166 and API specification hash 168 (e.g., a concatenation of API definition name 166 and API specification hash 168). For example, for API definition 164 having API definition name 166 "payment" and API specification hash 168 "432c34e," API definition 164 may be referred to as "payment:432c34e", similar to the process currently used for images.

In certain embodiments, API definitions 164 are not deployed in the cluster. API definitions 164 may be added manually by a user and/or by CI/CD pipeline 120. When added by CI/CD pipeline 120, API specification hashes 168 may be associated with unique hashes of Git commits 134. Each API definition 164 may be associated with multiple Git commits 134, as multiple Git commits 134 may share the same API specification 162. In some embodiments, each API definition 164 is subject to specification analysis. The specification analysis may result in a set of findings. When APIs 160 are deployed, APIs 160 may be reported by a network controller (e.g., triggered in the CD phase of CI/CD pipeline 120) and represented as runtime APIs 180.

Runtime APIs 180 are APIs 160 that have been deployed. In certain embodiments, runtime APIs 180 are referred to with one or more of the following: runtime API names 182, a cluster, a namespace, a service name, and/or a port git commit. Runtime API name 182 and Git commit 134 allow the mapping of any runtime API 180 with its corresponding API definition 164. In the CD phase of CI/CD pipeline 120, Git commit 134 is available. A user (e.g., a programmer) can verify that the service port is named after API 160, so the name is also available at that stage. Multiple runtime APIs 180 may be associated with a single API definition 164 since the same API definition 164 may be deployed multiple times. In certain embodiments, application security tool 150 generates runtime API catalog 184, which is a searchable library of runtime APIs 180.

API definitions 164 and runtime APIs 180 may be visually represented to a user (e.g., a programmer) in different formats. For example, each API definition 164 may be cataloged such that its associated runtime APIs 180 are displayed as a tab in the detail of API definition 164. This is similar to how this is currently done with external APIs and API endpoints, where API endpoints are a tab for external API details. As another example, API definitions 164 and runtime APIs 180 may be separated into two separate catalogs of API definitions 164 and Runtime APIs 180, potentially linked to each other.

In certain embodiments, runtime APIs 180 are scored according to the runtime analysis (e.g., trace analysis, broken function level authorization (BFLA), etc.). Runtime APIs 180 may be subject to specification reconstruction, which may highlight shadow APIs, zombie APIs, and the like. Shadow APIs exist and/or operate outside the information technology (IT) governance, management, and/or security of an entity. For example, shadow APIs may be generated when developers bypass controls to quickly release, update, and/or deprecate APIs 160. Zombie APIs are forgotten, abandoned, and/or outdated APIs. For example, zombie APIs may have been replaced by newer versions.

In certain embodiments, the runtime analysis depend on one or more of the following factors: (1) API specification 162 used for the service; (2) whether the runtime findings are generated by Flask/Fast APIs on the software that implements the service; (3) the rest of the software stack; (4) the serverless/container/virtual machine (VM) stack on which API 160 runs; (4) the entire software pipeline used to build artifacts 132 into a solution; and/or (5) the cloud posture itself. In certain embodiments, all of these factors tied together represent the runtime findings for a specific deployment of application 140. In some embodiments, API specifications 162 are captured into the Software Bill of Materials (SBOM). For runtime-generated API specifications 162, information provided and/or generated from Flask/Fast API may be capturable in the SBOM.

Vulnerabilities 190 of system 100 are weaknesses or flaws in software, hardware, organizational processes, and the like that, when compromised by a threat, may result in a security breach. Vulnerabilities 190 may be associated with APIs 160. For example, vulnerabilities 190 may be associated with broken access control attacks, broken authentication issues, excessive data exposure, insecure direct object reference, broken object/function level authorization, broken user authentication, injection, improper assets management, security misconfiguration, mass assignment, and the like.

In certain embodiments, vulnerabilities 190 are associated with the implementation of API specifications 162 (e.g., the implementation of an OAS with a server). Application security tool 150 may determine vulnerabilities 190 in API specifications 162. In some embodiments, application security tool 150 uses API specification hashes 168 to determine which vulnerabilities 190 are relevant. Application security tool 150 may analyze the combination of API specification 162 and its underlying software. In certain embodiments, application security tool 150 ties discovered vulnerabilities 190 in API specifications 162 to sequences in artifact trees 136. The sequences may capture some or all parts of application 140.

This concept can be extended to any problem (e.g., vulnerability 190) found in the code in that same artifact tree 136. In certain embodiments, each sequence is structured so that vulnerabilities 190 manifest themselves from application infrastructure to application logic. In some embodiments, this concept may be extended to any issue found in the code in that same sequence. For example, this concept may be extended to a cloud security posture management (CSPM) tool.

As applications 140 are developed and parts of artifact trees 136 come and go, new artifacts 132 may be selectively tested and existing vulnerabilities 190 can be selectively asserted. API specifications 162 may be like any other components in applications 140, and API specification hashes 168 are similar to GitBOM hashes. In certain embodiments, all parts of an application tree (application infrastructure and logic) combined with the tools that are used to build application 140 (e.g., the integrated development environment (IDE), compilers, pipelines, etc.) are captured in artifact trees 136. In certain embodiments, hashes are generated for artifact trees 136 (e.g., whole trees or sub-trees). Issues such as vulnerabilities 190 may be discovered in infrastructural components (e.g., Common Vulnerabilities and Exposures (CVEs)) in the software for the (enterprise) server application (e.g., Open Web Application Security Project (OWASP) API/serverless issues, etc.). As these issues are discovered, artifact trees 136 may be attributed with those discovered issues. In certain embodiments, some discovered issues are relevant for multiple parts of artifact trees 136.

In certain embodiments, the discovered vulnerability tree is used for pen-testers and/or fuzzers. For example, specific tests (e.g., fuzzing or penetration testing) may be developed that try to exploit known vulnerabilities 190. Certain vulnerabilities 190 may be easier to address than others. For example, Internet facing vulnerabilities 190 over API 160 may be easier to address than standard C library (libc) vulnerabilities 190. In some embodiments, the results of the pen-testers and/or fuzzers are captured in artifact trees 136. Artifact trees 136 may morph into new artifact trees 136 as developers continuously build new code. Discovered vulnerabilities 190 and/or pen-test results may be transported into new artifact trees 136 when parts of applications 140 have not changed (e.g., when the gitBOM hash did not change or when new artifacts 132 placed in artifact tree 136 are subjected to a new vulnerability analysis campaign). In certain embodiments, application security tool 150 assesses the morphing vulnerabilities 190 in artifact tree 136 given the morphing of applications 140.

In operation, application security tool 150 generates a plurality of API definitions 164 for a plurality of APIs 160. Each API definition 164 is associated with API specification 162 and API definition name 166. Each API specification 162 is hashed using a hashing algorithm (e.g., SHA-256) to generate API specification hashes 168. Each API definition 164 is referenced by a concatenation (e.g., "payment: 432c34e") of its associated API definition name 266 (e.g., "payment") and API specification hash 168 (e.g., 432c34e").

Application security tool 150 mounts one or more API definitions 164 with one or more applications 140 and deploys applications 140 by CI/CD pipeline 120. Upon deployment of applications 140 by CI/CD pipeline 120, API specification hashes 168 are associated with unique hashes of Git commits 134. Application security tool 150 implements runtime APIs 180 and maps runtime APIs 180 to their associated API definitions 164 using API definition names 166 and/or Git commits 134. Application security tool 150 performs a runtime analysis of runtime APIs 180.

Application security tool 150 generates API definition catalog 170 of API definitions 164 and runtime API catalog 184 of runtime APIs 180. Application security tool 150 generates a visual representation for the mapping of runtime APIs 180 to API definitions 164 using API definition catalog 170 and/or runtime API catalog 184. Application security tool 150 determines vulnerabilities 190 in API specifications 162 and ties discovered vulnerabilities 190 in API specifications 162 to sequences in artifact trees 136, which may capture some or all parts of application 140. As such, specific tests (e.g., fuzzing or penetration testing) may be developed that attempt to exploit known vulnerabilities 190, which may increase the security in applications 140.

Although FIG. 1 illustrates a particular number of networks 110, CI/CD pipelines 120, artifact repositories 130, artifacts 132, Git commits 134, artifact trees 136, applications 140, application security tools 150, APIs 160, API specifications 162, API definitions 164, API definition names 166, API specification hashes 168, API definition catalogs 170, runtime APIs 180, runtime API names 182, runtime API catalogs 184, and vulnerabilities 190, this disclosure contemplates any suitable number of networks 110, CI/CD pipelines 120, artifact repositories 130, artifacts 132, Git commits 134, artifact trees 136, applications 140, application security tools 150, APIs 160, API specifications 162, API definitions 164, API definition names 166, API specification hashes 168, API definition catalogs 170, runtime APIs 180, runtime API names 182, runtime API catalogs 184, and vulnerabilities 190.

Although FIG. 1 illustrates a particular arrangement of network 110, CI/CD pipeline 120, artifact repository 130, artifacts 132, Git commits 134, artifact trees 136, applications 140, application security tool 150, APIs 160, API specifications 162, API definitions 164, API definition names 166, API specification hashes 168, API definition catalog 170, runtime APIs 180, runtime API names 182, runtime API catalog 184, and vulnerabilities 190, this disclosure contemplates any suitable arrangement of network 110, CI/CD pipeline 120, artifact repository 130, artifacts 132, Git commits 134, artifact trees 136, applications 140, application security tool 150, APIs 160, API specifications 162, API definitions 164, API definition names 166, API specification hashes 168, API definition catalog 170, runtime APIs 180, runtime API names 182, runtime API catalog 184, and vulnerabilities 190. For example, a network controller may perform one or more actions of application security tool 150.

Figure 2:
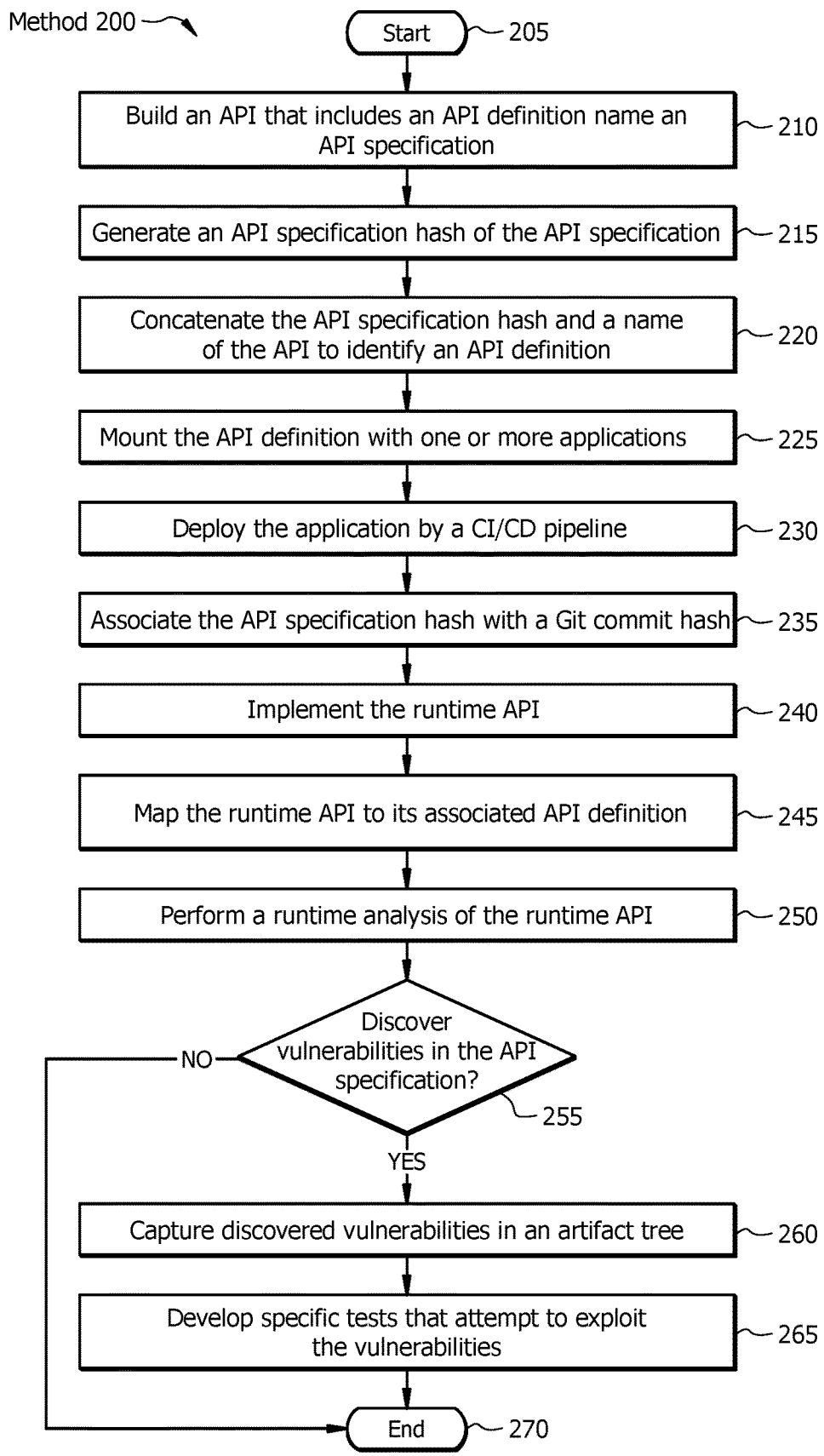
FIG. 2 illustrates a method for API security integration, in accordance with certain embodiments.

FIG. 2 shows a method for API security integration, in accordance with certain embodiments. Method 200 of FIG. 2 starts at step 205. At step 210, a user builds an API that includes an API specification and an API name. For example, referring to FIG. 1, a developer may build API 160 with API specification 162 (e.g., an OAS) and API definition name 166 (e.g., "payment"). Method 200 then moves from step 210 to step 215, where an application security tool generates a hash of the API specification. For example, referring to FIG. 1, application security tool 150 may generate API specification hash 168 (e.g., "432c34e") for API specification 162 using a SHA-256 algorithm. Method 200 then moves from step 215 to step 220.

At step 220 of method 200, the application security tool concatenates the API specification hash and a name of the API to generate an identifier for the API definition. For example, referring to FIG. 1, application security tool 150 may concatenate API specification hash 168 (e.g., "432c34e") and API definition name 166 (e.g., "payment") to generate an identifier (e.g., "payment:432c34e") for API definition 164. Method 200 then moves from step 220 to step 225, where the application security tool mounts the API definition with one or more applications. For example, referring to FIG. 1, application security tool 150 may mount API definition 164 with one or more applications 140. Method 200 then moves from step 225 to step 230.

At step 230 of method 200, the application security tool deploys the application by a CI/CD pipeline. For example, referring to FIG. 1, application security tool 150 may deploy application 140 by CI/CD pipeline 120. Method 200 then moves from step 230 to step 235, where the application security tool associates the API specification hash with a unique hash of the Git commit at the time of deployment. For example, referring to FIG. 1, application security tool 150 may associate API specification hash 168 with a unique hash of Git commit 134, which serves as a snapshot of artifact repository 130 at that specific point in time. Method 200 then moves from step 235 to step 240.

At step 240 of method 200, the application security tool implements the runtime API by the CI/CD pipeline. For example, referring to FIG. 1, application security tool 150 may implement runtime API 180 by the CI/CD pipeline 120 during the CD phase. Method 200 then moves from step 240 to step 245, where the application security tool maps the runtime API to its associated API definition using the API definition name, the runtime API name, and/or the API Git commit. For example, referring to FIG. 1, application security tool 150 may map runtime API 180 to its associated API definition 164 using runtime API name 182 and API definition name 166. As another example, referring to FIG. 1, application security tool 150 may map runtime API 180 to its associated API definition 164 using API definition name 166 and/or Git commit 134. Method 200 then moves from step 245 to step 250.

At step 250 of method 200, the application security tool performs a runtime analysis of the runtime API. For example, referring to FIG. 1, application security tool 150 may perform a runtime analysis of runtime API 180 to determine the runtime findings for this specific deployment of application 140. The runtime analysis depend on one or more of the following factors: (1) the API specification used for the service; (2) whether the runtime findings are generated by Flask/Fast APIs on the software that implements the service; (3) the rest of the software stack; (4) the serverless/container/VM stack on which the API runs; (4) the entire software pipeline used to build artifacts 132 into a solution; and/or (5) the cloud posture itself. One or more of these factors combined may represent the runtime findings for a specific deployment of application 140. Method 200 then moves from step 250 to step 255.

At step 255 of method 200, the application security tool determines whether there are vulnerabilities associated with the API specification. For example, referring to FIG. 1, application security tool 150 may determine vulnerabilities 190 associated with the implementation of the server and determine which of those vulnerabilities 190 are relevant to API specification 162. If the application security tool determines that there are not vulnerabilities in the API specification, method 200 moves from step 255 to step 270, where method 200 ends.

If, at step 255, the application security tool determines that there are vulnerabilities in the API specification, method 200 moves from step 255 to step 260, where the application security tool captures the discovered vulnerabilities in an artifact tree. For example, referring to FIG. 1, application security tool 150 may capture discovered vulnerabilities 190 in artifact tree 136. Method 200 then moves from step 260 to step 265, where the application security tool develops specific tests that attempt to exploit the vulnerabilities. For example, referring to FIG. 1, application security tool 150 may develop specific fuzz tests and/or penetration tests that attempt to exploit vulnerabilities 190 in API specification 162. Method 200 then moves from step 265 to step 270, where method 200 ends.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method for API security integration including the particular steps of the method of FIG. 2, this disclosure contemplates any suitable method for API security integration including any suitable steps, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
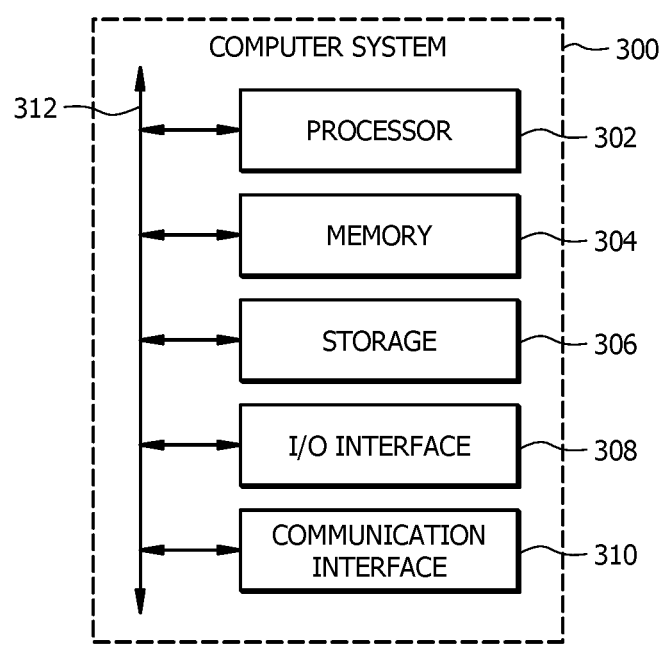
FIG. 3 illustrates a computer system that may be used by the systems and methods described herein, in accordance with certain embodiments.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An application security tool, comprising:
   one or more processors; and
   one or more computer-readable non-transitory storage media coupled to the one or more processors and comprising instructions that, when executed by the one or more processors, cause the application security tool to perform operations comprising:
   generating an application programming interface (API) definition by observing traffic, wherein the API definition is associated with an API definition name and an API specification;
   mounting the API definition with an application;
   deploying the application by a Continuous Integration/Continuous Delivery (CI/CD) pipeline;
   implementing a runtime API; and
   mapping the runtime API to the API definition.

2. The application security tool of claim 1, wherein generating the API definition comprises:
   generating a hash of the API specification; and
   concatenating the API definition name and the hash of the API specification.

3. The application security tool of claim 2, the operations further comprising:
   associating the hash of the API specification with a unique hash of a Git commit; and
   mapping the runtime API to the API definition using the unique hash of the Git commit.

4. The application security tool of claim 1, the operations further comprising:
associating the runtime API with a runtime API name; and
mapping the runtime API to the API definition using the runtime API name and the API definition name.

5. The application security tool of claim 1, the operations further comprising:
performing a runtime analysis of the runtime API;
determining, in response to performing the runtime analysis, whether the API definition is a shadow API; and
determining, in response to performing the runtime analysis, whether the API definition is a zombie API.

6. The application security tool of claim 1, the operations further comprising:
generating a catalog of a plurality of API definitions, wherein the plurality of API definitions comprises the API definition;
generating a plurality of runtime APIs, wherein the plurality of runtime APIs comprises the runtime API;
mapping the plurality of runtime APIs to the API definition; and
creating a tab for the API definition in the catalog of API definitions, wherein the tab visually represents the plurality of runtime APIs.

7. The application security tool of claim 1, the operations further comprising:
generating an API definition catalog for a plurality of API definitions, wherein the plurality of API definitions comprises the API definition;
generating a runtime API catalog for a plurality of runtime APIs, wherein the plurality of runtime APIs comprises the runtime API;
mapping the plurality of runtime APIs to the plurality of API definitions; and
generating a visual representation of the API definition catalog and the runtime API catalog that links the plurality of API definitions to the plurality of runtime APIs.

8. A method, comprising:
generating an application programming interface (API) definition by observing traffic, wherein the API definition is associated with an API definition name and an API specification;
mounting the API definition with an application;
deploying the application by a Continuous Integration/Continuous Delivery (CI/CD) pipeline;
implementing a runtime API; and
mapping the runtime API to the API definition.

9. The method of claim 8, wherein generating the API definition comprises:
generating a hash of the API specification; and
concatenating the API definition name and the hash of the API specification.

10. The method of claim 9, further comprising:
associating the hash of the API specification with a unique hash of a Git commit; and
mapping the runtime API to the API definition using the unique hash of the Git commit.

11. The method of claim 8, further comprising:
associating the runtime API with a runtime API name; and
mapping the runtime API to the API definition using the runtime API name and the API definition name.

12. The method of claim 8, further comprising:
performing a runtime analysis of the runtime API; and
determining, in response to performing the runtime analysis, whether the API definition is a shadow API; and
determining, in response to performing the runtime analysis, whether the API definition is a zombie API.

13. The method of claim 8, further comprising:
generating a catalog of a plurality of API definitions, wherein the plurality of API definitions comprises the API definition;
generating a plurality of runtime APIs, wherein the plurality of runtime APIs comprises the runtime API;
mapping the plurality of runtime APIs to the API definition; and
creating a tab for the API definition in the catalog of API definitions, wherein the tab visually represents the plurality of runtime APIs.

14. The method of claim 8, further comprising:
generating an API definition catalog for a plurality of API definitions, wherein the plurality of API definitions comprises the API definition;
generating a runtime API catalog for a plurality of runtime APIs, wherein the plurality of runtime APIs comprises the runtime API;
mapping the plurality of runtime APIs to the plurality of API definitions; and
generating a visual representation of the API definition catalog and the runtime API catalog that links the plurality of API definitions to the plurality of runtime APIs.

15. One or more computer-readable non-transitory storage media embodying instructions that, when executed by a processor, cause the processor to perform operations comprising:
generating an application programming interface (API) definition by observing traffic, wherein the API definition is associated with an API definition name and an API specification;
mounting the API definition with an application;
deploying the application by a Continuous Integration/Continuous Delivery (CI/CD) pipeline;
implementing a runtime API; and
mapping the runtime API to the API definition.

16. The one or more computer-readable non-transitory storage media of claim 15, wherein generating the API definition comprises:
generating a hash of the API specification; and
concatenating the API definition name and the hash of the API specification.

17. The one or more computer-readable non-transitory storage media of claim 16, the operations further comprising:
associating the hash of the API specification with a unique hash of a Git commit; and
mapping the runtime API to the API definition using the unique hash of the Git commit.

18. The one or more computer-readable non-transitory storage media of claim 15, the operations further comprising:
associating the runtime API with a runtime API name; and
mapping the runtime API to the API definition using the runtime API name and the API definition name.

19. The one or more computer-readable non-transitory storage media of claim 15, the operations further comprising:
performing a runtime analysis of the runtime API;
determining, in response to performing the runtime analysis, whether the API definition is a shadow API; and
determining, in response to performing the runtime analysis, whether the API definition is a zombie API.

20. The one or more computer-readable non-transitory storage media of claim 15, the operations further comprising:
    generating a catalog of a plurality of API definitions, wherein the plurality of API definitions comprises the API definition;
    generating a plurality of runtime APIs, wherein the plurality of runtime APIs comprises the runtime API;
    mapping the plurality of runtime APIs to the API definition; and
    creating a tab for the API definition in the catalog of API definitions, wherein the tab visually represents the plurality of runtime APIs.

* * * * *